(12) United States Patent
Lukaszewski et al.

(10) Patent No.: US 10,547,344 B2
(45) Date of Patent: Jan. 28, 2020

(54) ANTENNA MODULATION BASED ON ATTRIBUTE OF AN ANTENNA, RADIO AND/OR INCUMBENT TRANSMITTER SIGNAL

(71) Applicant: Aruba Networks, Inc., Sunnyvale, CA (US)

(72) Inventors: Chuck Lukaszewski, Santa Clara, CA (US); Eric Norman Johnson, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 16 days.

(21) Appl. No.: 15/614,234

(22) Filed: Jun. 5, 2017

(65) Prior Publication Data

US 2018/0351598 A1 Dec. 6, 2018

(51) Int. Cl.
| H04B 1/401 | (2015.01) |
| H04B 17/27 | (2015.01) |
| H04B 17/14 | (2015.01) |
| H04B 17/391 | (2015.01) |
| H01Q 3/24 | (2006.01) |

(52) U.S. Cl.
CPC ............... H04B 1/401 (2013.01); H01Q 3/24 (2013.01); H04B 17/14 (2015.01); H04B 17/27 (2015.01); H04B 17/391 (2015.01)

(58) Field of Classification Search
None
See application file for complete search history.

(56) References Cited

U.S. PATENT DOCUMENTS

| 7,620,396 B2 | 11/2009 | Floam et al. |
| 8,351,546 B2 | 1/2013 | Vitek |
| 8,583,446 B2 | 11/2013 | Williams |
| 2003/0220126 A1* | 11/2003 | Fujii ..................... H04W 88/02 455/550.1 |
| 2006/0014503 A1* | 1/2006 | Theobold ........... G01R 29/0878 455/126 |
| 2006/0218392 A1* | 9/2006 | Johnston ................ H04B 15/00 713/156 |
| 2010/0317391 A1* | 12/2010 | Mody ................. H04L 63/1458 455/512 |

(Continued)

FOREIGN PATENT DOCUMENTS

| WO | 97/50275 A2 | 12/1997 |
| WO | 2014/027390 A1 | 2/2014 |

(Continued)

OTHER PUBLICATIONS

Atia, G. et al.; "Spectrum Enforcement and Liability Assignment in Cognitive Radio Systems"; Oct. 14-17, 2008; 3 pages.

(Continued)

*Primary Examiner* — Alejandro Rivero
(74) *Attorney, Agent, or Firm* — Brooks, Cameron & Huebsch, PLLC (57) ABSTRACT

Example implementations relate to an antenna. In some examples, a system may comprise a radio, an antenna, and an enforcer. The antenna may be connected to the radio and the antenna may be non-functional until an enabling signal is received. The enforcer may modify the enabling signal in response to a determination whether a utilization of the antenna by the radio is permitted.

14 Claims, 4 Drawing Sheets

(56) References Cited

U.S. PATENT DOCUMENTS

| | | | |
|---|---|---|---|
| 2012/0052827 A1 | 3/2012 | Sadek et al. | |
| 2013/0137487 A1* | 5/2013 | Sato | H04M 1/72522 455/566 |
| 2014/0225590 A1 | 8/2014 | Jacobs | |
| 2016/0088554 A1 | 3/2016 | Igartua et al. | |
| 2016/0248464 A1* | 8/2016 | Alavi | H04B 15/02 |
| 2016/0301259 A1 | 10/2016 | Zeine et al. | |

FOREIGN PATENT DOCUMENTS

| | | |
|---|---|---|
| WO | 2016/067845 A1 | 5/2016 |
| WO | 2016/167845 A1 | 10/2016 |

OTHER PUBLICATIONS

Masonta, M. T. et al.; "Cloud Based Spectrum Manager for Future Wireless Regulatory Environment"; Dec. 2015; 9 pages.
European Search Report and Search Opinion Received for EP Application No. 17198688.8, dated May 14, 2018, 6 pages.

* cited by examiner

ANTENNA MODULATION BASED ON ATTRIBUTE OF AN ANTENNA, RADIO AND/OR INCUMBENT TRANSMITTER SIGNAL

BACKGROUND

Radio systems may include transmitting and receiving information using radio waves. The radio waves may be transmitted and received by systematically modulating properties of electromagnetic energy waves transmitted through space such as the wave's amplitude, frequency, phase, or pulse width.

For example, a radio may include a radio transmitter and/or a radio receiver. The radio transmitter may generate a radio frequency alternating current by modulating a property of energy to impress a signal upon. The radio transmitter may supply the radio frequency alternating current to an antenna. The antenna may convert the radio frequency alternating current to the electromagnetic energy waves, or radio waves, and radiate those waves into space. An antenna may also intercept a portion of the power of the electromagnetic waves in order to produce a voltage to a radio receiver. The radio receiver may electronically amplify and/or extract information via demodulation of the electromagnetic wave.

Various combinations of radio transmitters, radio receivers, signal amplifiers, and/or antennas may be utilized together. Attributes of particular radio transmitters, radio receivers, signal amplifiers, and/or antennas may alter the power and other attributes associated with a radio wave.

DETAILED DESCRIPTION

The configuration and operation of radio systems is regulated by various international, national, and local regulatory bodies. For example, the Federal Communication Commission (FCC) is an independent agency of the United Stated government that issues and enforces regulations on uses of radio frequency spectrum in the United States. Compliance with such regulations may be compulsory under penalty of law.

In an example, regulators, such as the FCC, may promulgate regulations limiting the transmit power of a radio system. As used herein, the term transmit power may, for example, refer to a total power output of the antenna plus a radio transmitter. In another example, a regulator may promulgate a regulation limiting the portion of the radio spectrum that a particular type of radio signal or radio system may utilize. In yet another example, a regulator may promulgate a regulation limiting how far above the horizon an antenna may point. All that is to say that the configuration and the operation of radio systems are subject to various regulations, the contravention of which subjects the radio system operator/installer/manufacturer to fines and/or disciplinary actions.

The regulations may be designed to preserve portions of the radio spectrum and/or to prevent interference among users of the radio spectrum. For example, Wi-Fi radio systems operate utilizing the 5 GHz portion of the radio spectrum. However, the Wi-Fi radio system is not the prioritized user of that portion of the spectrum. For example, the 5 GHz portion of the radio spectrum is shared with some radar systems, some satellite communication systems, and other systems. These systems are incumbent radio systems of that portion of the radio spectrum. As used herein, the term incumbent may, for example, refer to a radio system, a radio signal, a radio link between a transmitting radio and a receiving radio, transmitting radio in a radio link, a receiving radio in a radio link, and/or a transmitting or receiving purpose associated with a radio system that is given precedent over other radio systems or radio spectrum utilization purposes with regard to use of the portion of the spectrum. An incumbent radio system may include a radio system that is licensed through a regulatory body to utilize a portion of the radio spectrum. As such, the regulations may be designed to prevent the ability of a non-incumbent signal from a non-incumbent radio system (e.g., an unlicensed radio system operating on a shared portion of the radio spectrum), such as a Wi-Fi radio system on the 5 GHz portion of the spectrum, for example, to interfere with an incumbent signal from an incumbent radio system such as a radar system on the 5 GHz portion of the spectrum.

While some manufacturers of radio transmitters, radio receivers, and antennas perform extensive testing to establish that their equipment conforms to the various regulations, ultimately whether the equipment complies with regulations may depend on the configuration and/or operation of the equipment in the field. For example, in the field varieties of radio transmitters, radio receivers, and antennas may be combined in a manner that contravenes regulations. Further, electronic amplifiers may be utilized in the combination of radio transmitters, radio receivers, and antennas resulting in the contravention of regulations. Further still, radio transmitters, radio receivers, and antennas may be utilized in improper configurations, orientations, and/or environments that constitute a violation of a regulation.

Radio system operators and/or radio system installers may knowingly contravene the regulations. For example, a radio system operator and/or radio system installer may willfully assemble or operate a radio system in a manner that violates a regulation in order to establish a radio link between points where the radio link may not be readily established within the regulations. For example, the radio system operator and/or radio system installer may utilize equipment that was not intended to be utilized together, black or grey market equipment, amplifiers, and unapproved orientations to strengthen an otherwise weak radio link between two points. The non-complaint radio systems may introduce unlawful interference with the signals of other users of the radio spectrum.

In other examples, radio system operators and/or radio system installers may unknowingly contravene regulations. For example, a radio system operator and/or radio system installer may unwittingly assemble or configure equipment in a manner that violates regulations. Regardless of the intent, the non-compliant radio systems may introduce unlawful interference with the signals of other users of the radio spectrum.

As radio system technology and radio spectrum use evolves, so too may the regulations. Regulations may be changed to adapt to new realities resulting in equipment already installed in the field falling into non-compliance.

Further, regulations may vary from location to location. For example, different countries may have different regulations. As such, a radio system including a particular radio transmitter, a particular radio receiver, and/or a particular antenna may comply with the regulations in one country, but the same radio system or configuration thereof may violate regulations in another country. Regardless of the reasons for non-compliance, non-compliant radio systems may introduce unlawful interference with the signals of other users of the radio spectrum.

Persistent violation of the regulations combined with a lack of an ability to directly monitor and control the operation and configuration of radio systems has led to increased regulations and unwillingness to grant access to large portions of the radio spectrum. In contrast, the examples included herein may provide a direct mechanism for radio spectrum regulation compliance and enforcement through modifying an ability of the antenna to radiate a signal. The examples may include a system comprising a radio, an antenna connected to the radio, and an enforcer. The antenna may be non-functional until an enabling signal is received and the enforcer may modify the enabling signal in response to a determination whether a utilization of the antenna by the radio is permitted.

Figure 1:
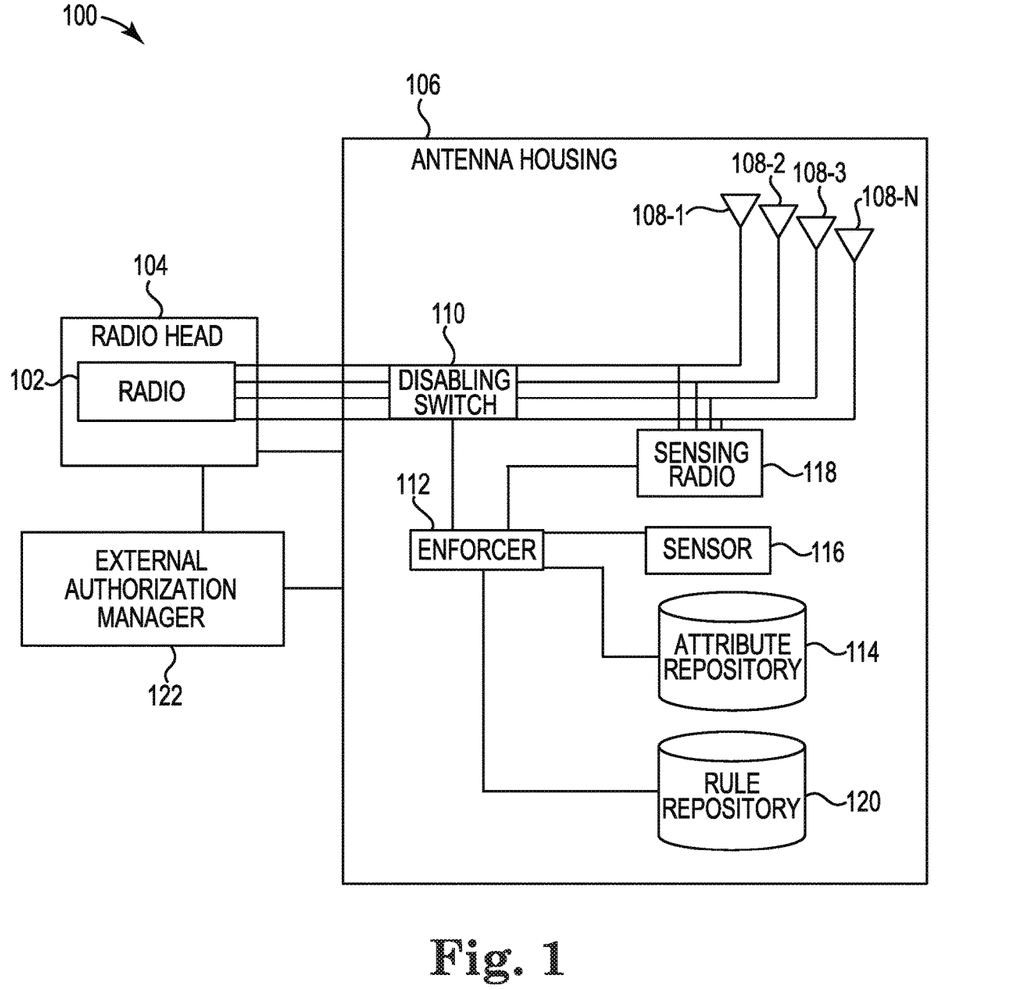
FIG. 1 illustrates an example of a system for an antenna consistent with the disclosure.

FIG. 1 illustrates an example of a system 100 for an antenna consistent with the disclosure. As illustrated in FIG. 1, the system 100 may be a radio system for transmitting and receiving information using radio waves.

The system 100 may include a radio 102. A radio 102 may include electronic components to operate as a radio transmitter and/or a radio receiver. That is, the radio 102 may include radio frequency transmit and/or receive functionality.

In FIG. 1, the radio 102 is illustrated as located within a radio head 104. The radio head 104 may include a discrete housing containing the transmit functions, receive functions, filtering, amplification equipment, and/or a baseband radio processor of the system 100. As used herein, the term discrete housing may, for example, refer to a housing that is individually physically separate, distinct, outside of, and/or discontinuous with an antenna housing 106 and/or an antenna 108. The radio head 104 may utilize a real-time operating system (RTOS) as its firmware. The radio head 104 may be physically separate from an antenna housing 106. However, the system 100 is not limited to such a topology. For example, the system 100 may instead have a topology that does not include a radio head 104, but instead utilizes a stand-alone discrete radio 102 in cabled communication with the antenna housing 106. As used herein, the term discrete radio may, for example, refer to a radio that is individually physically separate, distinct, outside of, and/or discontinuous with a radio head 104, an antenna housing 106, and/or an antenna 108. In another example, the system 100 may instead have the radio 102 located within or combined with the antenna housing 106. For example, the system may have a topology of a Wi-Fi access point having the radio 102 and the antennas 108-1 . . . 108-N (hereinafter individually and/or collectively referred to as antenna 108) combined within a single housing. That is, the examples described herein may work with all varieties of radio technology and link topologies regardless of the location or collocation of the radio 102 and the antenna 108 and whether the interface between the radio 102 and the antenna 108 is physical cabling or a digital interface. FIG. 1 illustrates the system 100 topology including the radio 102 within a radio head 104 for ease of illustration, but this topology should not be taken in a limiting sense.

The radio 102 may generate a radio frequency alternating current by modulating a property of energy to impress a signal upon. The radio 102 may supply the radio frequency alternating current to an antenna 108.

As described above, the system 100 may include an antenna housing 106. The antenna housing 106 may be a discrete antenna housing 106 that is physically separate from the radio head 104 and/or the radio 102. As used herein, the term discrete antenna housing may, for example, refer to an antenna housing that is individually physically separate, distinct, outside of, and/or discontinuous with a radio head 104 and/or the radio 102. However, in some examples, the antenna housing 106 may include the radio 102. The antenna housing 106 may include a housing for the antenna 108 of the system.

The antenna 108 may include a radiating portion that radiates electromagnetic energy waves, or radio waves, in a particular three-dimensional region of space in response to a signal from a radio 102 utilizing the antenna 108 for transmitting and receiving radio signals. The three-dimensional region may be defined by a property of each antenna 108 called its "pattern". For example, the antenna 108 may include a directional or an omnidirectional pattern, or may be capable of switching between the two in some implementations. The antenna 108 may convert a radio frequency alternating current received from the radio 102 to the electromagnetic energy waves, or radio waves, and radiate the waves into space. An antenna 108 may also intercept a portion of the power of an electromagnetic wave traveling through space in order to produce a voltage to the radio 102. The radio 102 may electronically amplify and/or extract information via demodulation of the electromagnetic wave.

The system 100 may include a disabling switch 110. The disabling switch 110 may be located and/or operational within the antenna housing 106. The disabling switch 110 may be a physical component located in line in a path between the radio 102 and the antenna 108. For example, the disabling switch 110 may be instantiated as a "dead man" radio frequency switch such as a PIN diode that operates in a normally open position in the path of cabling that carries signals between the radio 102 and the antenna 108. As such, the connection between the radio 102 and the antenna may be interrupted by the presence of the disabling switch 110 in its default open position. The disabling switch 110 may enter a closed position, thereby eliminating the interruption in the path of the cabling, responsive to an enabling signal. Upon removal of the enabling signal and/or upon receiving a disabling signal, the disabling switch 110 may return to a default open position.

As described above, in a default state without the application of an enabling signal the disabling switch 110 may remain open and the connection between the radio 102 and the antenna 108 may remain interrupted. Consequently, the antenna 108 may have a non-functional or disabled default state. That is, the antenna 108 may have a default non-radiating state as the signal from the radio 102 is prevented from reaching the antenna 108 for transmission on account of the interrupted signal path there between. In other words, the antenna 108 may be non-functional and/or disabled in the absence of an enabling signal provided to the disabling switch 110. That is, the antenna 108 may be non-functional until an enabling signal is received at the disabling switch 110. This is in contrast to antennas that are simply passive radio system equipment that may be cabled up to a radio and will immediately begin to work. Instead, the antenna 108 may rely on an enabling signal and/or the absence of a disabling signal following an enabling signal to serve as an antenna for the radio 102.

In some examples, the disabling switch 110 may alternatively be located in line in a power supply to the antenna 108. In these examples, the disabling switch 110 may interrupt and/or redirect the power supplied to the antenna 108 such that the antenna 108 may be in a non-functional and/or disabled state in the absence of an enabling signal to the disabling switch 110. Regardless of whether the disabling switch 110 interrupts the power supply to the antenna 108 or the signal from the radio 102 to the antenna 108, the antenna 108 may not function to radiate the signal from the radio 102 as a radio wave when the disabling switch 110 is in the default open state.

As described above, the system 100 may include topologies where the radio 102 and the antenna 108 are housed together in a single enclosure such as the antenna housing 106 eliminating external cabling between the radio 102 and the antenna 108. In such examples, the radio 102 may have a more direct control over the operation of the antenna 108. In such examples, the disabling switch 110 may be instantiated in machine-readable instructions executable by a processor within the single enclosure to render the antenna 108 to a non-functional and/or disabled state (e.g., unable to radiate in response to a signal from the radio 102) in the absence of an enabling signal.

The system 100 may include an enforcer 112. The enforcer 112 may be local to the antenna 108. For example, the enforcer 112 may include electronic components and/or machine-readable instructions executable by a processing resource associated with the antenna housing 106. In some examples, the electronic components and/or processing resource may be located within the antenna housing 106.

The enforcer 112 may include electronic components and/or machine-readable instructions executable by a processing resource to modify an enabling signal provided to the disabling switch 110. Modifying the enabling signal may include controlling the state of an enabling signal. For example, modifying the enabling signal may include producing and/or providing the enabling signal. Modifying the enabling signal may include discontinuing production of and/or discontinuing the provision of the enabling signal. The enabling signal may include a physical signal and/or digital instructions provided to the disabling switch 110. Responsive to receiving the enabling signal, the disabling switch 110 may enable the operation of the antenna 108. For example, in response to receiving the enabling signal, the disabling switch 110 may eliminate the interruption of power to the antenna 108 and/or may eliminate the interruption of the communication of a signal from the radio 102 to the antenna 108. The disabling switch 110 may, for example, eliminate the interruption by switching the disabling switch 110 from a default open state to a closed state.

The enforcer 112 may modify the enabling signal by producing the enabling signal and/or applying the enabling signal to the disabling switch 110. Applying the enabling signal to the disabling switch 110 may cause the disabling switch 110 to enable the antenna 108 for use as an antenna for the radio 102. The disabling switch 110 may continue to enable the antenna 108 for use as an antenna for the radio 102 as long as the enabling signal is continuously applied. In some examples, the disabling switch 110 may continue to enable the antenna 108 for utilization as a radio signal radiator for the radio 102 so long as the disabling switch receives additional enabling signals or enabling signal confirmations within predetermined periods of time. In some examples, the disabling switch 110 may continue to enable the antenna 108 for utilization as an antenna for the radio 102 until a disabling signal is received. The disabling signal may include the absence of an enabling signal, or an explicit disabling signal. As such, the enforcer may modify the enabling signal by applying the enabling signal to the disabling switch 110 continuously, applying the enabling signal to the disabling switch 110 periodically, discontinuing the application of the enabling signal to the disabling switch 110, and/or applying a disabling signal to the disabling switch 110.

The enforcer 112 may modify the enabling signal in response to a determination whether a utilization of the antenna 108 by the radio 102 is permitted. The determination of whether a utilization of the antenna 108 by the radio 102 is permitted may be based on a comparison of an attribute of the antenna 108 to a rule. Additionally, the determination of whether a utilization of the antenna 108 by the radio 102 is permitted may be based on a comparison of an attribute of the radio 102 to a rule. In some examples, the determination of whether a utilization of the antenna 108 by the radio 102 is permitted may be based on a comparison of an attribute of the radio 102 and an attribute of the antenna 108 to a rule.

As used herein, an attribute of an antenna 108 may, for example, include a characteristic of the antenna 108. However, the attribute of the antenna 108 may also include a characteristic of the antenna housing 106 that the antenna 108 is located within. An attribute of an antenna 108 may additionally include characteristics of components within and/or associated with the antenna housing 106. An attribute of an antenna 108 may include characteristics of components associated with the antenna 108 and/or the antenna housing 106 that may influence the operation of the antenna 108. Additionally, an attribute of an antenna 108 may include characteristics of an environment of the antenna 108.

For example, an attribute of the antenna 108 may include a unique identifying number associated with the antenna 108 and/or antenna housing 106, a make associated with the antenna 108 and/or antenna housing 106, a model associated with the antenna 108 and/or antenna housing 106, a manufacturer associated with the antenna 108 and/or antenna housing 106, a type associated with an antenna 108 and/or antenna housing 106, a beam pattern associated with the antenna 108 and/or antenna housing 106, a polarization associated with the antenna 108 and/or antenna housing 106, a gain associated with the antenna 108 and/or antenna housing 106, an operating bandwidth associated with the antenna 108 and/or antenna housing 106, and other characteristics of the antenna 108 and/or antenna housing 106. As used herein, the term gain may, for example, include a metric of the antenna's 108 directivity and electrical efficiency that may be expressed as a ratio of the power produced by the antenna 108 from a far-field source on the antenna's 108 beam access to the power produced by a hypothetical lossless isotropic antenna. These and other attributes may be determined and/or stored in an attribute repository 114 by a manufacturer. The attribute repository 114 may include a data storage architecture such as a database that utilizes a security protocol including encryption to avoid altering of the data by an operator and/or installer. The attribute repository 114 may be local to the antenna 108 and local to the antenna housing 106. For example, the attribute repository 114 may include attributes stored on a machine-readable storage medium associated with the antenna housing 106 that houses the antenna 108.

In some examples, attributes may be stored on a machine-readable storage medium located within the antenna housing 106.

An attribute of an antenna 108 may also include a licensing status of the antenna 108, a payment status of the antenna 108, a maintenance agreement status of the antenna 108, and/or a warranty status of the antenna 108. A licensing status may include a status indicator (e.g., e.g., valid, invalid, expired, paid, unpaid, etc.) associated with a licensing agreement related to owning, operating, and/or possessing the antenna 108. The licensing agreement may be an agreement between an owner or operator of the antenna 108 and a commercial entity such as a manufacturer, leasing entity, a service provider, a maintenance provider, and/or distributor of the antenna 108. Alternatively or additionally, the licensing agreement may be an agreement between an owner or operator of the antenna 108 and a regulatory body such as a regulatory agency that promulgates radio spectrum regulations. The payment status may include a status indicator (e.g., paid, unpaid, late payment, pending payment, etc.) associated with a payment related to owning, operating, and/or possessing the antenna 108. The payment may be a payment from an owner or operator of the antenna 108 to a commercial entity such as a manufacturer, leasing entity, a service provider, a maintenance provider, and/or distributor of the antenna 108. The payment may be a payment to purchase the antenna 108, a payment to lease the antenna 108, and/or a payment to operate the antenna 108. A maintenance agreement status may include a status indicator (e.g., active, inactive, in renewal period, void, level of service, etc.) associated with the maintenance agreement for providing maintenance to the antenna 108 and/or radio system. The maintenance agreement may be an agreement between the owner or operator of the antenna 108 and a commercial entity such as a manufacturer, leasing entity, a service provider, a maintenance provider, and/or distributor of the antenna 108. A warranty status may include a status indicator (e.g., valid, invalid, expired, registered, unregistered, etc.) associated with a warranty agreement related to owning, operating, and/or possessing the antenna 108. The warranty agreement may be an agreement between an owner or operator of the antenna 108 and a commercial entity such as a manufacturer, leasing entity, a service provider, a maintenance provider, and/or distributor of the antenna 108. The information may be stored in attribute repository 114 or stored and/or updated from a remote attribute repository accessible by the enforcer 112 over a network connection.

An attribute of an antenna 108 may also include telemetry data defining a three-dimensional orientation of the antenna 108 and/or antenna housing 106. Such attributes may be collected from a sensor 116. A sensor 116 may include a single sensor or a sensor package. The sensor 116 may include electronic components and/or machine-readable instructions executable by a processor to sense metrics associated with the three-dimensional orientation of the antenna 108 and/or the antenna housing 106. The sensor 116 may be local to the antenna 108 and/or the antenna housing 106. For example, the sensor 116 may be associated with the antenna housing 106 that is housing the antenna 108. In some examples, the sensor 116 may be located within the antenna housing 106. The sensor 116 may include an accelerometer, a thermometer, a compass, an altimeter, a global positioning system (GPS) receiver and/or a dedicated GPS antenna, etc. As such, the attributes of the antenna 108 and/or antenna housing 106 collected from the sensor 116 may include, but are not limited to, latitude of the antenna 108 and/or antenna housing 106, longitude of the antenna 108 and/or antenna housing 106, country of operation of the antenna 108 and/or antenna housing 106, an elevation of the antenna 108 and/or antenna housing 106, a pointing azimuth of the antenna 108 and/or antenna housing 106, a pointing tilt angle of the antenna 108 and/or antenna housing 106, whether the antenna 108 and/or antenna housing 106 is deployed outdoors, whether the antenna 108 and/or antenna housing 106 is in motion, a velocity of travel of the antenna 108 and/or antenna housing 106, etc.

As used herein, an attribute of a radio 102 may, for example, include a characteristic of the radio 102. However, the attribute of the radio 102 may also include a characteristic of a housing associated with the radio 102 such as a radio head 104 or antenna housing 106 that the radio 102 is located within. An attribute of a radio 102 may additionally include characteristics of components within and/or associated with the radio 102 or a housing thereof. The components may include components that may influence the operation of the radio 102. Additionally, an attribute of a radio 102 may include characteristics of an environment of the radio 102.

For example, an attribute of a radio 102 may include a unique identifying number of the radio 102, a make of the radio 102, a model of the radio 102, a manufacturer of the radio 102, a type of device of the radio 102, a license status (e.g., valid, invalid, expired, paid, unpaid, etc.) of the radio 102 and/or a warranty status (e.g., valid, invalid, expired, registered, unregistered, etc.) of the radio 102. The attribute of the radio 102 may include a configured operating center frequency of the radio 102, a channel bandwidth of the radio 102, a configured transmit (Tx) duty cycle of the radio 102, a conducted power of the radio 102, an amplitude of a signal transmitted from the radio 102 en route to the antenna 108, etc. The attributes may be collected from the radio 102 and/or a remote storage unit across a network connection. The attributes may be collected by the enforcer 112.

The attributes may be collected utilizing a sensing radio 118. The sensing radio 118 may be a discrete sensing radio. As used herein, the term discrete sensing radio may, for example, refer to a sensing radio that is individually physically separate, distinct, outside of, and/or discontinuous with a radio 102 and/or a radio head 104. The sensing radio 118 may include a transmit (Tx) sensing radio. The Tx sensing radio may be local to the antenna 108. For example, the Tx sensing radio may be located within the antenna housing 106 and/or in line with a communication path, such as a cabled interface, between the radio 102 and the antenna 108.

The Tx sensing radio may intercept and analyze a signal transmitted from the radio 102 to the antenna 108 to measure attributes of the signal such as its amplitude. From these measurements, the Tx sensing radio may determine and/or provide that data to determine the attributes of the radio 102 sending the signal. Since, as described above, some radio system operators and installers may install an amplifier to boost a signal as it leaves the radio 102 but before it reaches the antenna 108 a simple direct querying of the radio 102 to determine the attributes of the radio 102 may not accurately represent a transmit power associated with the radio 102. Utilizing the Tx sensing radio may allow for the collection of attributes of a radio 102 that account for the values of signals actually received by the antenna 108 from the radio 102 and incorporate those values into the attributes of the radio 102. In some examples, a mismatch between a value of a signal received by the antenna 108 from the radio 102 and a stored and/or predefined attribute associated with the radio 102 may be characterized as suspicious and instigate an immediate modification of an enabling signal to disable the antenna 108.

In addition to the Tx sensing radio, the sensing radio 118 may include a second radio. For example, the sensing radio 118 may include a discrete receive (Rx) sensing radio. The Rx sensing radio may be physically separate from a discrete Tx sensing radio described above and the radio 102. As used herein, the term discrete Rx sensing radio may, for example, refer to a housing that is individually physically separate, distinct, outside of, and/or discontinuous with a radio 102, a radio head 104, and/or a Tx sensing radio. The Rx sensing radio may be located within the antenna housing 106 in line in a path between the radio 102 and the antenna 108. The Rx sensing radio may utilize the antenna 108 to detect the presence of transmitters and/or radio signals associated with an incumbent radio link within a beam path of the antenna 108. Alternatively, the Rx sensing radio may utilize a separate and/or different antenna than the antenna 108 to detect the presence of transmitters and/or radio signals associated with an incumbent radio link. For example, the Rx sensing radio may utilize separate antenna of a different antenna type from the antenna 108 to detect the presence of transmitters and/or radio signals associated with an incumbent radio link. For instance, the Rx sensing radio may utilize an omnidirectional antenna instead of a directional antenna 108. The Rx sensing radio may have distinct power level from the Tx sensing radio. For example, the Rx sensing radio may detect relatively weak radio signals that have traversed space while the Tx sensing radio may detect substantially the full power of the radio 102 just before it reaches the antenna 108 for transmission. Additionally, the Rx sensing radio may be configured to detect specific modulation characteristics or signatures of radio signals that are known to distinguish the radio signals as belonging to an incumbent radio link. The utilization of the Rx sensing radio within an antenna housing 106 may offload, augment, and/or relive the corresponding decoding responsibilities of a radio head 104.

As described above, the determination of whether a utilization of the antenna 108 by the radio 102 is permitted may be based on a comparison of an attribute of the radio 102 and/or an attribute of the antenna 108 to a rule. The rule may include a regulation. A regulation may include a restriction regarding the configuration and/or operation of radio systems and/or the use of the radio spectrum by radio systems such as system 100. The regulation may be based a standard and/or rule promulgated by an official regulatory body that is empowered to regulate the use of the radio spectrum. A regulation may carry with it the force of law and/or subject a violator to fines and/or disciplinary actions. A non-limiting example of a regulation may include a maximum equivalent isotropically radiated power (EIRP), or transmit power, from the system 100 (e.g., the total power output for the antenna 108 and the radio 102 when the radio 102 utilizes the antenna 108 to transmit a radio signal). Other non-limiting examples of regulations may include a regulation limiting the portion of the radio spectrum that a particular type of radio signal may utilize, a regulation limiting how far above the horizon an antenna 108 may point, a regulation awarding precedent to incumbent radio links over a portion of the radio spectrum, a regulation specifying allowable combinations of varieties of radios and antennas. The regulation may be an international, national, and/or local rule.

As used herein, the term rule may, for example, not be limited to regulations promulgated by official regulating bodies and/or rules carrying the weight of law. As used herein, the term rule may, for example, additionally include business and/or commercial terms. For example, a rule may include a manufacturer, distributor, or brand rule or term of service. For example, the rule may include a rule prohibiting the combination of a certain radio 102 or antenna 108 type, make, model, manufacturer, serial number, unique identifier with third party radio or antenna. In another example, the rule may include a rule prohibiting the operation of a radio 102 and/or an antenna 108 outside of a license or warranty period. Alternatively, the rule could be the absence of manufacturer certification to combine a certain radio 102 with a certain antenna 108 type.

The above described rules may be stored as instructions on a machine-readable medium in a rule repository 120. The rule repository 120 may include a data storage architecture such as a database. The rule repository 120 may utilize a security protocol including encryption to avoid altering of the data by an operator and/or installer. The rule repository 120 may be local to the antenna 108. For example, the rule repository 120 may be associated with the antenna housing 106 that is housing the antenna 108. In some examples, the rule repository 120 may be located within the antenna housing 106. The rule repository 120 may be populated by manufacturers during manufacture. However, the rule repository 120 may be updated periodically from a remote rule repository. For example, radio spectrum regulations are subject to change. As such, when radio spectrum regulations are updated or changed a rule repository 120 may be updated from a remote rule repository operated by a regulatory body and/or regulation promulgating service to reflect the change. Additionally, rules associated with commercial entities such as manufacturers, distributors, service providers, maintenance providers, leasing entities, etc. may be periodically updated or changed. The rule repository 120 may be updated from a remote rule repository operated by such a commercial entity. Regardless of the operator of the remote rule repository, the remote rule repository may be a discrete rule repository. As used herein, the term discrete rule repository may, for example, refer to a rule repository that is individually physically separate, distinct, remote from, outside of, and/or discontinuous with an antenna housing 106

As described above, the rules may be stored in and/or retrieved from a remote rule repository. For example, the rules may be stored in a remote rule database that is accessible to and/or part of an external authorization manager 122, which is discussed in greater detail below.

Once again, the determination of whether a utilization of the antenna 108 by the radio 102 is permitted may be based on a comparison of an attribute of the radio 102 and/or an attribute of the antenna 108 to a rule. In some examples, such a determination may be made by the enforcer 112. That is, the enforcer 112 may conduct the comparison of inputs of the attribute of the radio 102 and/or the attribute of the antenna 108 to a rule to determine if the utilization is permitted. The enforcer 112 may determine that the utilization is not permitted when the attribute of the radio 102 and/or the attribute of the antenna 108 indicate that operation of the system 100 will violate a rule. The enforcer 112 may determine that the utilization is permitted when the attribute of the radio 102 and/or the attribute of the antenna 108 do not indicate that operation of the system 100 will violate a rule.

In some examples, the enforcer 112 may determine whether a utilization of the antenna 108 by the radio 102 is permitted in response to an authorization signal received from an external authorization manager 122. A portion of the authorization manager 122 may be remote from the antenna 108, the antenna housing 106, and/or the radio 102. For example, the authorization manager 122 may be located on a server remote from the antenna housing 106. The authorization manager 122 may include machine-readable instructions executable by a processing resource to operate as a spectrum access system (SAS).

For example, the authorization manager 122 may perform the comparison of an attribute of the radio 102 and/or an attribute of the antenna 108 to a rule to determine if a utilization of the antenna 108 by the radio 102 is permitted. The authorization manager 122 may be in communication with the enforcer 112 and/or the antenna housing 106 across a communication network such as the Internet. As used herein, being in communication with the antenna housing 106 may, for example, include being in communication with the hardware, processing resources, and/or machine-readable instruction components of the antenna housing 106. For example, being in communication with the antenna housing 106 may include being in communication with the enforcer 112, the antenna 108, the disabling switch 110, the attribute repository 114, the regulation repository 120, the sensor 116, the sensing radio 118, etc.

The enforcer 112 may collect and/or package for transmission the attribute of the radio 102, the attribute of the antenna 108, a rule, and/or other data from the sensing radio 118, the sensor 116, the attribute repository 114, and/or the rule repository 120. The enforcer 112 may communicate the collected data over the network to the external authorization manager 122 for use as inputs in its comparison.

The external authorization manager 122 may be operated by a manufacturer of the radio 102, a manufacturer of the antenna 108, a third party, a regulatory body, etc. The external authorization manager 122 may include and/or have access to international, national, and/or local rules, equipment specifications for various radios and/or antennas, testing data from manufacturers of various radios and/or antennas, a repository of transmitters and/or radio links operating in a corresponding portion of the radio spectrum, etc.

In some examples, the external authorization manager 122 may compare the above described inputs received from the enforcer 112 and utilize them to derive and/or compare an EIRP for a proposed utilization of an antenna 108 by a radio 102 to an EIRP regulation. If the comparison results in a determination that the EIRP for a proposed utilization of an antenna 108 by a radio 102 violates a rule, then the external authorization manager 122 may discontinue and/or refrain from transmitting an authorization signal to the antenna housing 106. The discontinuation and/or lack of an authorization signal received at the antenna housing 106 and/or by the enforcer 112 may result in a determination that a utilization of an antenna 108 by a radio 102 is not permitted and the enforcer 112 may refrain from or discontinue the provision of an enabling signal to the disabling switch 110. If the comparison results in a determination that the EIRP for a proposed utilization of an antenna 108 by a radio 102 does not violate a rule, then the external authorization manager 122 may transmit and/or continue transmitting an authorization signal to the antenna housing 106. The provision and/or continued provision of an authorization signal received at the antenna housing 106 and/or by the enforcer 112 may result in a determination that a utilization of an antenna 108 by a radio 102 is permitted and the enforcer 112 may provide an enabling signal to the disabling switch 110.

In an example, the external authorization manager 122 may also include and/or have access to radio spectrum utilization data and/or radio modeling functionality. For example, the external authorization manager 122 may include and/or have access to data defining a current utilization of the radio spectrum by incumbent radio systems and/or non-incumbent radio systems. The external authorization manager 122 may utilize its radio modeling functionality to model the signals from and/or the utilization across the radio spectrum by the incumbent radio systems and/or non-incumbent radio systems. The radio model may include a mathematical and/or digital representation of measured and/or predicted locations and transmission paths of the modeled radio systems. The radio spectrum utilization data and/or the radio models may be utilized in the comparison of the above described inputs received from the enforcer 112 to a rule. For example, the rule may include a regulation prohibiting interference with an incumbent radio signal. The external authorization manager 122 may incorporate portions of the above described inputs received from the enforcer 112 into a radio model to determine whether the utilization of the antenna 108 by the radio 102 may result in an interference with an incumbent signal and therefore a violation of the regulation. The determination may be based on a comparison of a radio model of the utilization of the antenna 108 by the radio 102 to a radio model of an incumbent radio link.

In an instance where the utilization of the antenna 108 by the radio 102 poses an interference risk over a particular threshold amount, the external authorization manager 122 may discontinue and/or refrain from transmitting an authorization signal to the antenna housing 106. Again, the determination may be based on a comparison of a radio model of the utilization of the antenna 108 by the radio 102 to a radio model of an incumbent radio link. The discontinuation and/or lack of an authorization signal received at the antenna housing 106 and/or by the enforcer 112 may result in a determination that a utilization of an antenna 108 by a radio 102 is not permitted and the enforcer 112 may refrain from or discontinue the provision of an enabling signal to the disabling switch 110. In an instance where the utilization of the antenna 108 by the radio 102 does not pose an interference risk over a particular threshold amount, the external authorization manager 122 may transmit and/or continue transmitting an authorization signal to the antenna housing 106. The provision and/or continued provision of an authorization signal received at the antenna housing 106 and/or by the enforcer 112 may result in a determination that a utilization of an antenna 108 by a radio 102 is permitted and the enforcer 112 may provide an enabling signal to the disabling switch 110.

Although described as a signal providing an affirmative authorization in the examples above, it should be understood that the authorization signal generated by the external authorization manager 122 may alternatively be a rejection or a de-authorization. In such examples, the rejection or de-authorization may have an opposite effect on the enforcer 112 and/or the disabling switch 110 as its affirmative authorization counterpart described above.

Portions of the system 100 illustrated in FIG. 1 may be utilized in various compliance modes and combinations thereof. For example, a first compliance mode may include a physical installation verification mode. In a physical installation verification mode, the enforcer 112 may perform a self-contained utilization authorization. As used herein, the term self-contained utilization authorization may, for example, refer to a modification of the enabling signal to a disabling switch 110 based on a determination of whether a utilization of the antenna 108 by the radio 102 is permitted.

Further a self-contained utilization may include an example where the modification of the enabling signal and/or the determination of whether the utilization is permitted is performed local to the antenna 108 and/or the antenna housing 106. That is, the self-contained utilization authorization may occur within the antenna housing without the intervention of remote systems, such as the external authorization manager 122, and/or communication therewith. That is, the illustrated components of the antenna housing 106 may operate to self-verify whether a utilization of the antenna 108 by the radio 102 is permitted.

The physical installation verification mode may include the enforcer 112 collecting attributes of the antenna 108 from the attribute repository 114 and/or the sensor 116. The physical installation verification mode may include the enforcer 112 collecting a rule from the rule repository 120. The physical installation verification mode may include the enforcer 112 comparing the attributes of the antenna 108 to the rule to determine whether the utilization of the antenna 108 by the radio 102 is permitted.

For example, in the physical installation verification mode the enforcer 112 may compare attributes of the antenna 108, such as its beam pattern, its location, a direction of its movement, a velocity of its movement, its pointing angle, and whether it is outdoors, to corresponding rules to determine if a utilization is permitted. In an example, the enforcer 112 may compare a country of location of the antenna 108 to a rule regarding whether its utilization is permitted in that country. Similarly, the enforcer 112 may compare the location and movement of the antenna 108 to determine whether the antenna 108 has crossed a national border and then may compare a new country of location of the antenna 108 to a rule regarding whether its utilization is permitted in that country. In another example, the enforcer 112 may compare a country of location and a pointing angle of the antenna 108 to a rule regarding permitted pointing angles for the antenna 108 in that country. In yet another example, the enforcer 112 may compare whether the antenna 108 is deployed outdoors with a rule regarding whether the specific type, make, model, manufacturer, serial number, unique identifier, etc. of antenna 108 is allowed to be operated outdoors.

The enforcer 112 may determine, by the comparison of the attributes of the antenna 108 to the rule, whether the utilization of the antenna 108 with the collected attributes by the radio 102 is permitted. The enforcer 112 may determine that the utilization is permitted if it does not violate a rule. In such instances, the enforcer 112 may modify an application of the enabling signal to the disabling switch by applying the enabling signal to the disabling switch 110. The enforcer 112 may determine that the utilization is not permitted if it potentially violates a rule. In such instances, the enforcer 112 may modify an application of the enabling signal to the disabling switch by refraining from and/or discontinuing application of an enabling signal to the disabling switch 110.

The disabling switch 110 may disable the function of the antenna 108 in response to not receiving and/or no longer receiving an enabling signal from the enforcer 112. A disabled antenna 108 may include an antenna 108 that is rendered non-functional and/or unavailable to be utilized by the radio 102. The system 100 may communicate to a system operator that the antenna 108 is disabled. For example, the system 100 may generate a blinking LED, an error message, a system log, etc. that is visible to the system operator. The disabling switch 110 may enable the function of the antenna 108 in response to receiving and/or continuing to receive an enabling signal from the enforcer 112. An enabled antenna 108 may include an antenna 108 that is rendered unavailable to be utilized by the radio 102.

A second compliance mode may include a product verification mode. In contrast to the physical installation verification mode described above, the product verification mode may communicate with devices remote from the antenna housing 106 to verify product combinations and/or attributes. For example, a product verification mode may include a mode where an enforcer 112 may collect attributes of the antenna 108 from the attribute repository 114 and/or the sensor 116. The enforcer 112 may collect attributes of the radio 102 across a communication link between the enforcer 112 and the radio 102. For example, in topologies where the radio 102 and the antenna housing 106 are discrete and physically separate from one another, the enforcer 112 may collect attributes of the radio 102 utilizing a communication link such as a cabled connection, an Ethernet cabled connection, a data over cable service interface specification (DOCSIS) connection, a network connection, a wireless connection, a Bluetooth connection, a Zigbee connection, a connection over the Internet, a connection over a network switch, etc.

In the product verification mode, the enforcer 112 may compare the attributes of the antenna 108 and/or the attributes of the radio 102 to a rule. For example, the enforcer 112 may compare type, make, model, manufacturer, serial number, unique identifier, etc. attributes of the antenna 108 and/or the radio 102 to a rule regarding whether the type, make, model, manufacturer, serial number, unique identifier, etc. of the antenna 108 is allowed to be utilized by the type, make, model, manufacturer, serial number, unique identifier, etc. of the radio 102. Similarly, the enforcer 112 may compare the type, make, model, manufacturer, serial number, unique identifier, authenticity of product attributes of the antenna 108 and/or the radio 102 to a rule regarding whether the antenna 108 and/or the radio 102 are permitted to be utilized with a third party antenna or radio or are permitted to be utilized with a counterfeit antenna or radio. In another example, the enforcer 112 may compare license and/or warranty validity attributes of the antenna 108 and/or the radio 102 to a rule regarding whether the antenna 108 and/or the radio 102 are permitted to be utilized without an active license and/or active warranty with a commercial entity.

The enforcer 112 may determine, by the comparison of the attributes of the antenna 108 and/or the attributes of the radio 102 to the rule, whether the utilization of the antenna 108, having its corresponding collected attributes, by the radio 102, having its corresponding collected attributes, is permitted. The enforcer 112 may determine that the utilization is permitted if it does not violate a rule. In such instances, the enforcer 112 may modify an application of the enabling signal to the disabling switch 110 by applying the enabling signal to the disabling switch 110. The enforcer 112 may determine that the utilization is not permitted if it potentially violates a rule. In such instances, the enforcer 112 may modify an application of the enabling signal to the disabling switch 110 by refraining from and/or discontinuing application of an enabling signal to the disabling switch 110.

The disabling switch 110 may disable the function of the antenna 108 in response to not receiving and/or no longer receiving an enabling signal from the enforcer 112. A disabled antenna 108 may include an antenna 108 that is rendered non-functional and/or unavailable to be utilized by the radio 102. The disabling switch 110 may enable the function of the antenna 108 in response to receiving and/or continuing to receive an enabling signal from the enforcer 112. An enabled antenna 108 may include an antenna 108 that is rendered unavailable to be utilized by the radio 102.

The rules may be collected by the enforcer 112 from the rule repository 120. However, the rules may be collected and/or updated from a remote rule repository that is remote from the antenna housing 106, such as from a remote server operated by a regulatory body or commercial entities such as manufacturers, distributors, service providers, maintenance providers, leasing entities, etc. That is, the rules may be collected and/or updated from a discrete rule repository that is externally operated.

A third compliance mode may include a radio configuration verification mode. In radio configuration mode, the enforcer 112 may compare the attributes of the antenna 108 and/or the attributes of the radio 102 to a rule. The enforcer 112 may collect the attributes of the antenna 108 from a sensor 116 and/or an attribute repository 114.

In the radio configuration verification mode, the enforcer 112 may collect the attributes of the radio 102 from a sensing radio 118. For example, the enforcer may collect the attributes of the radio 102 from a Tx sensing radio inline in the connection between the radio 102 and the antenna 108. In this manner, the enforcer 112 may collect the attributes of the radio 102 without utilizing communication outside of the antenna housing 106 by using the Tx sensing radio to intercept and analyze attributes of the radio 102 from a signal traversing the connection en route to the antenna 108.

In the radio configuration verification mode, the enforcer 112 may collect the rules from the rule repository 120. However, the rules may be collected and/or updated from a rule repository remote from the antenna housing 106, such as from a remote server operated by a regulatory body or commercial entities such as manufacturers, distributors, service providers, maintenance providers, leasing entities, etc.

In the radio configuration verification mode, the enforcer 112 may compare the attributes of the antenna 108 and/or the attributes of the radio 102 to a rule. For example, the enforcer 112 may compare a configured EIRP and antenna gain attribute of the antenna 108 and/or a configured EIRP and/or conducted power attribute of the radio 102 to a rule regarding an EIRP limit. The enforcer 112 may compare the operating center frequency and channel bandwidth attributes of the antenna 108 and/or the radio 102 to a rule regarding permitted operating center frequencies and/or channel bandwidths. In another example, the enforcer 112 may compare Tx duty cycle attributes of the antenna 108 and/or the radio 102 to a rule regarding permitted Tx duty cycles.

The enforcer 112 may determine, by the comparison of the attributes of the antenna 108 and/or the attributes of the radio 102 to the rule, whether the utilization of the antenna 108, having its corresponding collected attributes, by the radio 102, having its corresponding collected attributes, is permitted. The enforcer 112 may determine that the utilization is permitted if it does not violate a rule. In such instances, the enforcer may modify an application of the enabling signal to the disabling switch by applying the enabling signal to the disabling switch 110. The enforcer 112 may determine that the utilization is not permitted if it potentially violates a rule. In such instances, the enforcer may modify an application of the enabling signal to the disabling switch by refraining from and/or discontinuing application of an enabling signal to the disabling switch 110.

The disabling switch 110 may disable the function of the antenna 108 in response to not receiving and/or no longer receiving an enabling signal from the enforcer 112. A disabled antenna 108 may include an antenna 108 that is rendered non-functional and/or unavailable to be utilized by the radio 102. The disabling switch 110 may enable the function of the antenna 108 in response to receiving and/or continuing to receive an enabling signal from the enforcer 112. An enabled antenna 108 may include an antenna 108 that is rendered unavailable to be utilized by the radio 102.

A fourth compliance mode may include a detect and vacate mode. In detect and vacate mode, the enforcer 112 may compare the attributes of the antenna 108 and/or the attributes of the radio 102 to a rule. The enforcer 112 may collect the attributes of the antenna 108 from a sensor 116 and/or an attribute repository 114. The enforcer 112 may collect the attributes of the radio 102 from a sensing radio 118, such as a Tx sensing radio, from the attribute repository 114, and/or from a communication with the radio 102.

The detect and vacate mode may also include the utilization of an Rx sensing radio. For example, in detect and vacate mode, the enforcer 112 may collect the rules from the rule repository 120. However, the rules may be collected and/or updated from a sensing radio 118 such as an Rx sensing radio. The rules, in such examples, may be a detected presence of an incumbent radio link the beam path of antenna 108 that, if interfered with, may constitute a violation of a rule. That is, the rule may include a rule that defines an incumbent radio link, a rule that defines a prohibition on the inference with the incumbent radio link, and/or a detected presence of a signal with an incumbent radio link-matching signal signature residing in a beam path.

In the detect and vacate mode, the enforcer 112 may compare the attributes of the antenna 108 and/or the attributes of the radio 102 to a rule. That is, the enforcer 112 may compare the attributes of the antenna 108 and/or the attributes of the radio 102 to a radio signal detected by the Rx sensing radio. The enforcer 112 may compare the attributes of the antenna 108 and/or the attributes of the radio 102 to a presence or an absence of an incumbent radio link. In this manner, a comparison of an attribute of the radio 102 and/or antenna 108 to a rule comprising the presence of a potentially incumbent radio link detected by the Rx sensing radio may inform a determination as to whether a utilization of the antenna by the radio is permitted.

The enforcer 112 may determine, by the comparison of the attributes of the antenna 108 and/or the attributes of the radio 102 to the rule, whether the utilization of the antenna 108, having its corresponding collected attributes, by the radio 102, having its corresponding attributes, is permitted. The enforcer 112 may determine that the utilization is permitted if it does not pose a risk of interference with an incumbent radio link above a threshold amount. In such instances, the enforcer 112 may modify an application of the enabling signal to the disabling switch 110 by applying the enabling signal to the disabling switch 110. The enforcer 112 may determine that the utilization is not permitted if it poses a risk of interference with an incumbent radio link above a threshold amount. In such instances, the enforcer 112 may modify an application of the enabling signal to the disabling switch 110 by refraining from and/or discontinuing application of an enabling signal to the disabling switch 110.

The disabling switch 110 may disable the function of the antenna 108 in response to not receiving and/or no longer receiving an enabling signal from the enforcer 112. A disabled antenna 108 may include an antenna 108 that is rendered non-functional and/or unavailable to be utilized by the radio 102. The disabling switch 110 may enable the function of the antenna 108 in response to receiving and/or continuing to receive an enabling signal from the enforcer

112. An enabled antenna 108 may include an antenna 108 that is rendered unavailable to be utilized by the radio 102.

A fifth compliance mode may include an external authorization mode. In external authorization mode, the enforcer 112 may collect the attributes of the antenna 108 and/or the attributes of the radio 102. The enforcer 112 may collect the attributes of the antenna 108 from a sensor 116 and/or an attribute repository 114. The enforcer 112 may collected the attributes of the radio 102 from the sensing radio, from communication with the radio 102, and/or from an attribute repository 114.

In external authorization mode, the enforcer 112 may transmit the attributes of the antenna 108 and/or the attributes of the radio 102 to an external authorization manager 122. The external authorization manager 122 may be remote from the antenna housing 106 and the enforcer 112 may transmit the attributes of the antenna 108 and/or the attributes of the radio 102 to an external authorization manager 122 via a communication link between the enforcer 112 and the external authorization manager 122. The external authorization manager 122 may be operated by a manufacturer of the antenna 108 and/or the radio 102, a regulatory body, and/or a third party.

The external authorization manager 122 may include and/or have access to attributes of incumbent radio links. As described above, an incumbent radio link may include a radio system, a radio signal, a radio link between a transmitting radio and a receiving radio, transmitting radio in a radio link, a receiving radio in a radio link, and/or a transmitting or receiving purpose associated with a radio system that is given precedent over other radio systems or radio spectrum utilization purposes with regard to use of a portion of the spectrum. An incumbent radio link may include a radio link between two radio systems that are licensed through a regulatory body to utilize a portion of the radio spectrum. The external authorization manager 122 may include and/or access a repository of radio spectrum rules that is remote from the antenna housing.

The external authorization manager 122 may compare the attributes of the antenna 108, the attributes of the radio 102, and/or an attribute of an incumbent radio link to a rule. The comparison may include determining, based on the attributes of the antenna 108, the attributes of the radio 102, and/or an attribute of an incumbent radio link, whether a utilization of the antenna 108 by the radio 102 poses a risk of interference with an incumbent radio link above a threshold amount. The rule may include a rule prohibiting interference with the incumbent radio link.

The external authorization manager 122 may determine, based on the comparison, that the utilization of the antenna 108 by the radio 102 poses a risk of interference with the incumbent radio link above a threshold amount and that inference would constitute a violation of a rule. In such examples, the external authorization manager 122 may refrain from transmitting and/or discontinue transmitting an authorizing signal to the enforcer 112.

Alternatively, the external authorization manager 122 may determine, based on the comparison, that the utilization of the antenna 108 by the radio 102 does not have a risk of interference with the incumbent radio link above a threshold amount and therefore will not cause an inference with the incumbent radio link that would constitute a violation of a rule. In such examples, the external authorization manager 122 may transmit and/or continue transmitting an authorizing signal to the enforcer 112.

The enforcer 112 may determine, based on the authorizing signal, whether the utilization of the antenna 108 by the radio 102 is permitted. The enforcer 112 may determine that the utilization is permitted when it receives and/or continues to receive an authorization signal from the external authorization manager 122. In such instances, the enforcer 112 may modify an application of the enabling signal to the disabling switch 110 by applying the enabling signal to the disabling switch 110. The enforcer 112 may determine that the utilization is not permitted when it has not received and/or is no longer receiving an authorizing signal from the external authorization manager 122. In such instances, the enforcer 112 may modify an application of the enabling signal to the disabling switch 110 by refraining from and/or discontinuing application of an enabling signal to the disabling switch 110.

The disabling switch 110 may disable the function of the antenna 108 in response to not receiving and/or no longer receiving an enabling signal from the enforcer 112. A disabled antenna 108 may include an antenna 108 that is rendered non-functional and/or unavailable to be utilized by the radio 102. The disabling switch 110 may enable the function of the antenna 108 in response to receiving and/or continuing to receive an enabling signal from the enforcer 112. An enabled antenna 108 may include an antenna 108 that is rendered unavailable to be utilized by the radio 102.

In some examples, ongoing and/or periodic authorizing signals from the external authorization manager 122 may be involved that occur on the scale of seconds, minutes, hours, or longer. The enforcer 112 may refrain from and/or discontinue transmitting an enabling signal for the disabling switch 110 in the event that communication between the enforcer 112 and the external authorization manager 122 is lost and/or a subsequent authorization signal is removed or rescinded. Additionally, the external authorization manager 122 may be configured to refrain from and/or discontinue transmitting an authorization signal to an enforcer 112 on demand, such as in response to request from an administrator of the external authorization manager 122 rather than as a result of a comparison of attributes of the antenna 108, the attributes of the radio 102, and/or an attribute of an incumbent radio link rule.

In addition to the compliance modes discussed above, the system 100 may also include a registration mode. In a registration mode a radio 102 and/or an antenna 108 may register itself with the external authorization manager 122 upon deployment. That is, responsive to being activated, powered on for a first time, and/or combined in a radio system, the radio 102 and/or an antenna 108 may establish communication with the external authorization manager and/or register themselves and/or their attributes with an external authorization manager 122 without operator and/or installer intervention.

In other examples, the radio 102 may, when combined with an antenna 108 and/or and antenna housing 106 that lacks the enforcer 112 and/or the disabling switch 110, report this information to the external authorization manager. As such, the external authorization manager 122 may be utilized to identify and disrupt the use of the radio 102 with an antenna 108 and/or and antenna housing 106 that lacks the enforcer 112 and/or the disabling switch 110 by reporting the combination to regulating authorities.

Figure 2:
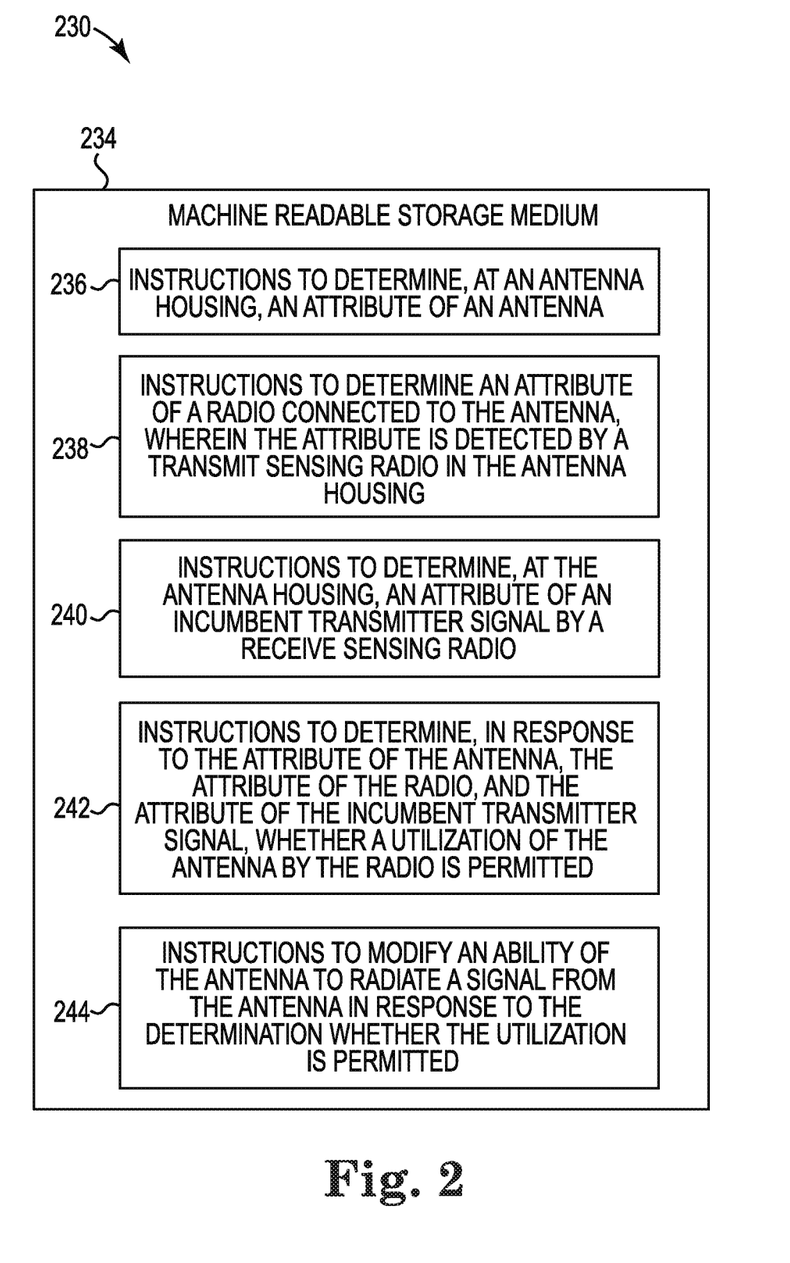
FIG. 2 is a block diagram of an example of a system for an antenna consistent with the disclosure.

FIG. 2 is a block diagram of an example system 230 for an antenna, consistent with the disclosure. In the example of FIG. 2, system 230 includes a processing resource and a machine-readable storage medium 234. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource may be a central processing unit (CPU), microprocessor, and/or other hardware device suitable for retrieval and execution of instructions stored in machine-readable storage medium 234. In the particular example shown in FIG. 2, processing resource may receive, determine, and send instructions 236, 238, 240, 242, and 244. As an alternative or in addition to retrieving and executing instructions, processing resource may include an electronic circuit comprising an electronic component for performing the operations of the instructions in machine-readable storage medium 234. With respect to the executable instruction representations or boxes described and shown herein, it should be understood that part or all of the executable instructions and/or electronic circuits included within one box may be included in a different box shown in the figures or in a different box not shown.

Machine-readable storage medium 234 may be any electronic, magnetic, optical, or other physical storage device that stores executable instructions. Thus, machine-readable storage medium 234 may be, for example, Random Access Memory (RAM), an Electrically-Erasable Programmable Read-Only Memory (EEPROM), a storage drive, an optical disc, and the like. The executable instructions may be "installed" on the system 230 illustrated in FIG. 2. Machine-readable storage medium 234 may be a portable, external or remote storage medium, for example, that allows the system 230 to download the instructions from the portable/external/remote storage medium. In this situation, the executable instructions may be part of an "installation package". As described herein, machine-readable storage medium 234 may be encoded with executable instructions related to antenna modulation.

Instructions 236, when executed by processing resource may cause system 230 to determine an attribute of an antenna. The attribute of the antenna may be determined at an antenna housing that houses the antenna. The attribute of the antenna may be determined by retrieving the attribute from an attribute repository stored in the antenna housing. The attribute of the antenna may be determined from a sensor in the antenna housing that senses the attribute of the antenna.

Instructions 238, when executed by processing resource, may cause system 230 to determine an attribute of a radio. Determining the attribute of the radio may include determining an attribute of a transmitting radio and/or a receiving radio that is connected to the antenna. In some examples, the radio may reside in the antenna housing. In other examples, the radio may reside external to and remote from the antenna housing.

The attribute of the radio may be measured by a sensing radio. For example, the attribute of the radio may be detected by a transmit (Tx) sensing radio. The Tx sensing radio may be a discrete and separate radio from the above described radio connected to the antenna. The Tx radio may be located within the antenna housing inline in a path between the radio and the antenna.

Instructions 240, when executed by processing resource, may cause system 230 to determine an attribute of an incumbent transmitter signal. The incumbent transmitter signal may include a radio signal intercepted by the antenna from a transmission across an incumbent radio link. The incumbent transmitter signal may be detected by a receive (Rx) sensing radio. The Rx sensing radio may be a discrete and separate radio from both the above described radio connected to the antenna and the above described Tx sensing radio. The Rx sensing radio may be located within the antenna housing inline in a path between the radio and the antenna. As such, the attribute of an incumbent transmitter signal may be determined at the antenna housing.

Instructions 242, when executed by processing resource, may cause the system 230 to determine whether a utilization of the antenna by the radio is permitted. A utilization of the antenna by the radio may include the radio generating a radio frequency alternating current by modulating a property of energy to impress a signal upon it, the radio supplying the radio frequency alternating current to the antenna, the antenna converting the radio frequency alternating current into electromagnetic energy radio waves, and/or the antenna radiating the radio waves into space.

A determination whether the utilization of the antenna by the radio is permitted may be in response to an attribute of the antenna, the attribute of the radio, and the attribute of the incumbent transmitter signal. For example, the determination whether the utilization of the antenna by the radio is permitted may be in response to a comparison of an attribute of the antenna, the attribute of the radio, an attribute of the incumbent transmitter signal, and/or a rule.

In an example, the determination whether the utilization of the antenna by the radio is permitted may include that utilization is permitted when the antenna is designated as a permitted antenna for combination with the radio by the radio manufacturer. Whether or not the antenna is designated as a permitted antenna for combination with the radio by the radio manufacturer may be determined by querying a repository of rules local to and/or remote from the antenna housing.

In some examples, the determination whether the utilization of the antenna by the radio is permitted may be performed by and/or based on a signal from an external authorization manager such as the external authorization manager 122 described in FIG. 1. The external authorization manager may be discrete, separate, and/or remote from the antenna housing. For example, the attribute of the antenna, the attribute of the radio, and/or the attribute of the incumbent transmitter signal may be transmitted from the antenna housing to an external authorization manager. The external authorization manager may utilize the transmitted attributes to perform the determination of whether the utilization of the antenna by the radio is permitted.

In some examples, the system 230 may negotiate with the external authorization manager. For example, the external authorization manager may compare the attribute of the antenna, the attribute of the radio, and/or the attribute of the incumbent transmitter signal and determine that the utilization of the antenna by the radio would result in a violation of a rule. As such, the external authorization manager may determine that the utilization of the antenna by the radio is not permitted. The external authorization manager may communicate back to the antenna housing the determination that the utilization is not permitted. In some examples, the external authorization manager may communicate back to the antenna housing a reason why the utilization was determined to not be permitted. For example, the external authorization manager may communicate back to the antenna housing that the EIRP associated with the utilization of the antenna by the radio, as determined from the attribute comparison, violates a rule because it is too high by 10 decibels (dB). In response to the determination that the utilization is not permitted and/or the reasons for the determination, the system 230 may adjust an attribute of the antenna and/or the radio in order bring the utilization in compliance with rules. For example, the power of the radio and/or the antenna may be reduced by 10 dB. Responsive to adjusting the attribute of the antenna and/or the radio, the system 230 may resubmit the adjusted attribute of the antenna to the external authorization manager to perform a second determination of whether the utilization of the antenna by the radio is permitted. The external authorization manager may then determine that the utilization is allowed.

Instructions 244, when executed by processing resource, may cause the system 230 to modify an ability of the antenna to radiate a signal from the antenna. The ability of the antenna to radiate a signal may be modified in response to the determination whether the utilization is permitted. For example, modifying the ability of the antenna to radiate a signal may include switching the antenna from a default non-radiating state to a radiating state in response to a determination that the utilization of the antenna by the radio is permitted. Modifying the ability of the antenna to radiate a signal may include switching the antenna from the radiating state back to the default non-radiating state in response to a determination that the utilization of the antenna by the radio is no longer permitted.

Figure 3:
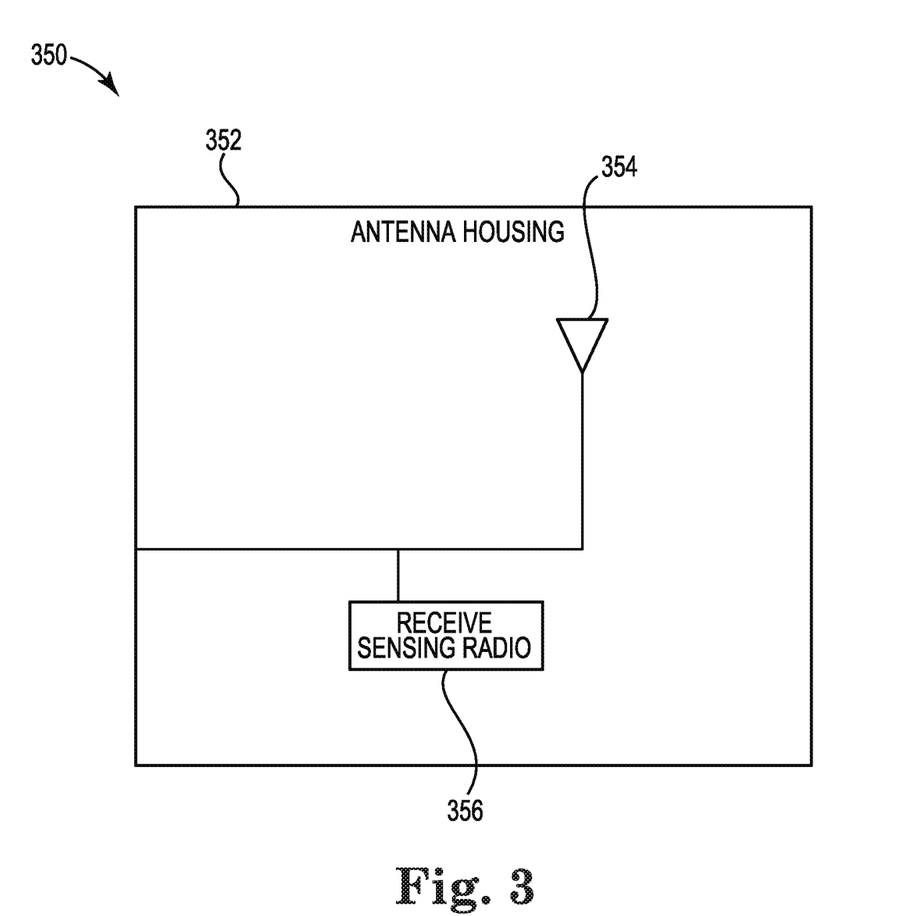
FIG. 3 is a block diagram of an example of a device consistent with the disclosure.

FIG. 3 is a block diagram of an example of a device 350 such as an antenna consistent with the disclosure. The device 350 may include an antenna housing 352. The antenna housing 352 may include an antenna 354. That is, a portion of the antenna 354 may be within the antenna housing 352.

The antenna housing 352 may include a receive sensing radio 356. A portion of the receive sensing radio 356 may be within the antenna housing 352. The receive sensing radio 356 may be in line in a signal path between a radio and an antenna 354. The receive sensing radio 356 may be discrete and physically separate from the radio. The receive sensing radio 356 may perform a wideband scan of signals intercepted by the antenna 354 to detect an incumbent transmitter in the operating area of the antenna 354.

The antenna housing 352 may include a transmit sensing radio. A portion of the transmit sensing radio may be within the antenna housing 352. The transmit sensing radio may be in line in a signal path between a radio and an antenna 354. The transmit sensing radio may be discrete and physically separate from both the radio and the receive sensing radio 356. The transmit sensing radio may measure a characteristic of a signal transmitted from the radio to the antenna 354. For example, the transmit sensing radio may measure a transmitting power of the radio based on an analysis of the signal transmitted from the radio to the antenna 354.

In some examples, the antenna housing 352 may include a sensor. The sensor may be part of a sensor array. A portion of the sensor may be within the antenna housing 352. The sensor may determine an attribute of the antenna 324. For example, the sensor may determine a latitude of the antenna 354, longitude of the antenna 354, country of operation of the antenna 354, an elevation of the antenna 354, a pointing azimuth of the antenna 354, a pointing tilt angle of the antenna 354, whether the antenna 354 is deployed outdoors, whether the antenna 354 is in motion, a velocity of travel of the antenna 354, a temperature of the antenna 354, etc.

In some examples, the antenna housing 352 may include an attribute repository. The attribute repository may include machine-readable storage medium, a portion of which is within the antenna housing 352, for storing attributes of the antenna 354. The attributes of the antenna 354 stored in the attribute repository may be provisioned at the time of manufacture of the device 350. The attribute repository may include an encrypted and/or non-alterable database. In some examples, the attribute repository may include a trusted platform module (TPM) to secure the attribute repository by integrating cryptographic keys.

The data from the transmit sensing radio, the receive sensing radio 356, the sensor, and/or an attribute repository within the antenna housing 352 may be utilized in a radio frequency regulatory compliance system such as system 100 illustrated in FIG. 1. Additionally, the data from the transmit sensing radio, the receive sensing radio 356, the sensor, and/or an attribute repository within the antenna housing 352 may be utilized in the performance adjustment and/or the maintenance systems.

For example, an operating country of an antenna 354 may be determined from GPS data from the sensor. The GPS data from the sensor may also be utilized to determine an operating country change for a mobile antenna 354. An operating country and/or a change in operating country may be provided to the radio. The radio may utilize the data to choose a legal operating channel for its present country of operation.

In another example, GPS data from the sensor may be transmitted to other antennas and/or to a network manager. The GPS data from two or more antennas in a point-to-point (PtP) or point-to-multipoint (PtMP) radio system may be utilized to determine a roundtrip time-of-flight to configure a timeout or other protocol operation at layer 2 and above.

In another example, GPS data from a sensor may be combined with a received signal power data from a receive sensing radio 356. The data may be transmitted to other antennas and/or to a network manager. The GPS data combined with the received signal power data may be utilized to directly measure a fading characteristic of a PtP or PtMP radio link. As used herein, the term fading characteristic may, for example, include a metric of an attenuation of a signal sent between antennas. The metric of attenuation may be based on variables including time, geographic position, and radio frequency.

In yet another example, a mismatch of antenna 354 with the radio may be detected, such as when the antenna 354 is not designed or able to support the center frequency that was selected by the radio utilizing it. A mismatch may be determined by comparing the radio attribute data detected by transmit sensing radio to antenna attribute data retrieved from attribute repository.

In another example, the velocity of travel of the antenna 354 detected by the sensor may be utilized to perform Doppler adjustments. The Doppler adjustments may increase channel estimation accuracy.

In another example, velocity of travel, location, and/or angle data of the antenna 354 may be incorporated in a mechanical tracking system. The mechanical tracking system may be utilized to determine and maintain an antenna alignment when either or both ends of a radio link are in motion relative to one another.

In another example, temperature data from the antenna housing 352 may be utilized to detect overheating or under-heating conditions in the antenna housing 352. The temperature data may be utilized to alert the device 350 of overheating or under-heating conditions in order to deploy ameliorative measures and/or trigger a maintenance call.

In another example, acceleration data, altitude data, and compass data may be utilized to detect a progressive misalignment of the antenna 354 caused by wind or other forces over time. The data may also be used to detect a sudden catastrophic misalignment due to a failure of the antenna housing 352 and/or antenna housing mounts.

Figure 4:
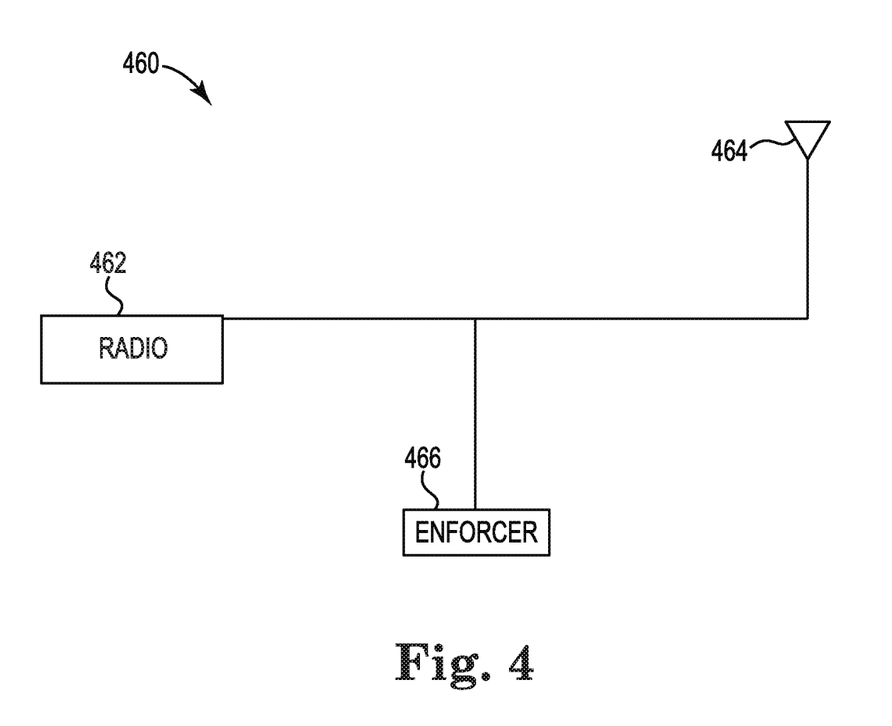
FIG. 4 illustrates an example of a system for an antenna consistent with the disclosure.

FIG. 4 illustrates an example of a system 460 for an antenna consistent with the disclosure. As illustrated in FIG. 4, the system 400 may be a radio system for transmitting and receiving information using radio waves.

The system 460 may include a radio 462. A radio 462 may include electronic components to operate as a radio transmitter and/or a radio receiver. That is, the radio 462 may include radio frequency transmit and/or receive functionality.

The radio 462 may generate a radio frequency alternating current by modulating a property of energy to impress a signal upon. The radio 462 may supply the radio frequency alternating current to an antenna 464.

The antenna 464 may include a radiating portion that radiates electromagnetic energy waves, or radio waves, in a particular three-dimensional region of space in response to a signal from a radio 462 utilizing the antenna 464 for transmitting and receiving radio signals. The three-dimensional region may be defined by a property of each antenna 464 called its "pattern". For example, the antenna 464 may include a directional or an omnidirectional pattern, or may be capable of switching between the two in some implementations. The antenna 464 may convert a radio frequency alternating current received from the radio 462 to the electromagnetic energy waves, or radio waves, and radiate those waves into space. An antenna 464 may also intercept a portion of the power of an electromagnetic wave traveling through space in order to produce a voltage to the radio 462. The radio 462 may electronically amplify and/or extract information via demodulation of the electromagnetic wave.

The system 460 may include an enforcer 466. The enforcer 466 may be local to the antenna 464. For example, the enforcer 466 may include electronic components and/or machine-readable instructions executable by a processing resource associated with an antenna housing containing the antenna 464. In some examples, the electronic components and/or processing resource may be located within the antenna housing.

The enforcer 466 may include electronic components and/or machine-readable instructions executable by a processing resource to modify an enabling signal provided to a disabling switch. Modifying the enabling signal may include controlling a state of the enabling signal. For example, modifying the enabling signal may include producing and/or providing the enabling signal. Modifying the enabling signal may including discontinuing production of and/or discontinuing the provision of the enabling signal. The enabling signal may include a physical signal and/or digital instructions provided to disabling switch. Responsive to receiving the enabling signal, the disabling switch may enable the operation of the antenna 464. For example, in responsive to receiving the enabling signal, the disabling switch may eliminate the interruption of power to the antenna 464 and/or may eliminate the interruption of the communication of a signal from the radio 462 to the antenna 464. The disabling switch may, for example, eliminate the interruption by switching the disabling switch from a default open state to a closed state.

The enforcer 466 may modify the enabling signal by producing the enabling signal and/or applying the enabling signal to the disabling switch. Applying the enabling signal to the disabling switch may cause the disabling switch to enable the antenna 464 for use as an antenna for the radio 462. The disabling switch may continue to enable the antenna 464 for use as an antenna for the radio 462 as long as the enabling signal is continuously applied. In some examples, the disabling switch may continue to enable the antenna 464 for utilization as a radio signal radiator for the radio 462 so long as the disabling switch receives additional enabling signals or enabling signal confirmations within predetermined periods of time. In some examples, the disabling switch may continue to enable the antenna 464 for utilization as an antenna for the radio 462 until a disabling signal is received. The disabling signal may include the absence of an enabling signal, or an explicit disabling signal. As such, the enforcer may modify the enabling signal by applying the enabling signal to the disabling switch continuously, applying the enabling signal to the disabling switch periodically, discontinuing the application of the enabling signal to the disabling switch, and/or applying a disabling signal to the disabling switch.

The enforcer 466 may modify the enabling signal in response to a determination whether a utilization of the antenna 464 by the radio 462 is permitted. The determination of whether a utilization of the antenna 464 by the radio 462 is permitted may be based on a comparison of an attribute of the antenna 464 to a rule. Additionally, the determination of whether a utilization of the antenna 464 by the radio 462 is permitted may be based on a comparison of an attribute of the radio 462 to a rule. In some examples, the determination of whether a utilization of the antenna 464 by the radio 462 is permitted may be based on a comparison of an attribute of the radio 462 and an attribute of the antenna 464 to a rule.

In some examples, the enforcer 466 may include the disabling switch. For example, the enforcer 466 may be part of the disabling switch. In some examples, the enforcer 466 may include machine-readable instructions executable by a processor to perform the functions of the disabling switch.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features. Furthermore, as used herein "a", "an", and/or singular nouns may refer to one or more than one.

What is claimed:

1. A system, comprising:
an antenna housing separate from a radio, the radio including a radio transmitter;
wherein the antenna housing encloses a plurality of elements, the plurality of elements including:
an antenna configured to be connected to the radio,
a disabling switch coupled with the antenna, wherein a connection between the radio and the antenna is to be interrupted unless an enabling signal is received by the disabling switch,
an attribute repository including a data storage, the data storage including a plurality of attributes of the antenna,
a transmit sensing radio coupled with the antenna, the transmit sensing radio configured to intercept radio signals generated by the radio for determination of one or more attributes of the radio, and
an enforcer configured to enable or disable the enabling signal in response to a determination whether a utilization of the antenna by the radio is permitted, wherein the determination whether the utilization of the antenna by the radio is permitted is based at least on a comparison of the one or more attributes of the radio and one or more attributes of the antenna from the attribute repository.

2. The system of claim 1, wherein the determination whether the utilization of the antenna by the radio is permitted includes a comparison of a first attribute of the plurality of attributes of the antenna to a rule.

3. The system of claim 2, wherein the first attribute of the antenna includes a three-dimensional orientation of the antenna collected from a sensor local to the antenna.

4. The system of claim 1, wherein the plurality elements further include a rule repository, the rule repository including one or more rules for utilization of the antenna; and
wherein the determination whether the utilization of the antenna by the radio is permitted includes a comparison of an attribute of the radio, an attribute of the antenna, or both to a rule of the of the one or more rules.

5. The system of claim 1, wherein the determination whether the utilization of the antenna by the radio is permitted includes a comparison of a radio model of the utilization of the antenna by the radio to a radio model of an incumbent radio link.

6. The system of claim 1, wherein the determination whether the utilization of the antenna by the radio is permitted is made by the enforcer.

7. The system of claim 1, wherein the determination whether the utilization of the antenna by the radio is permitted is in response to an authorization signal received from a remote external authorization system.

8. The system of claim 1, wherein the attribute repository includes a security protocol to prevent alteration of data in the attribute repository.

9. The system of claim 1, wherein the plurality of attributes of the antenna include one or more of a licensing status and a warranty status of the antenna with status indicator.

10. A non-transitory machine readable storage medium having stored thereon machine readable instructions to cause a computing processor to:
determine, at an antenna housing, an attribute of an antenna, the antenna housing enclosing the antenna, a disabling switch coupled with the antenna, an attribute repository including a data storage, a transmit sensing radio coupled with the antenna, and an enforcer;
determine one or more attributes of a radio connected to the antenna, the radio being separate from the antenna housing, wherein the one or more attributes of the radio are determined utilizing the transmit sensing radio in the antenna housing to intercept radio signals generated by the radio;
determine, based at least in part on a comparison of the one or more attributes of the radio and one or more attributes of the antenna from the attribute repository, whether a utilization of the antenna by the radio is permitted; and
enable or disable by the enforcer, utilizing the disabling switch, a connection between the radio and the antenna in response to the determination whether the utilization of the antenna by the radio is permitted.

11. The medium of claim 10, wherein determining whether the utilization of the antenna by the radio is permitted further includes:
determining that the utilization of the antenna by the radio is permitted upon determining that the antenna is designated a permitted antenna by a manufacturer of the radio.

12. The medium of claim 10, wherein determining whether the utilization of the antenna by the radio is permitted further includes:
submitting the one or more attributes of the antenna and the one or more attributes of the radio to an external authorization manager to perform the determination of whether the utilization of the antenna by the radio is permitted;
adjusting the one or more attributes of the antenna responsive to a determination from the external authorization manager that the utilization is not permitted; and
resubmitting the adjusted attribute one or more of the antenna to the external authorization manager to perform a second determination of whether the utilization of the antenna by the radio is permitted.

13. The medium of claim 10, wherein enabling or disabling a connection between the radio and the antenna includes switching from a default non-radiating state for the antenna to a radiating state for the antenna in response to a determination that the utilization of the antenna by the radio is permitted.

14. The medium of claim 13, further comprising instructions to:
switch the antenna from the radiating state back to the default non-radiating state in response to a determination that the utilization of the antenna by the radio is no longer permitted.

* * * * *